United States Patent Office 3,259,190
Patented July 5, 1966

3,259,190
METHOD OF IMPROVING FLUID FLOW IN WELLS
Richard L. Parsons, Redwood City, Calif., assignor to Chevron Research Company, a corporation of Delaware
No Drawing. Filed Mar. 30, 1961, Ser. No. 179,504
(Filed under Rule 47(b) and 35 U.S.C. 118)
6 Claims. (Cl. 166—42)

This invention relates to improving the permeability of petroliferous formations by fracturing and, more particularly, this invention relates to propping agents used to support lifted strata in fracturing operations.

Fracturing is one method of improving fluid flow in petroleum-bearing formations penetrated by a well. In the art of fracturing, fluid flow channels are created or existing fluid flow channels are improved by means of high pressure injection of liquid into an oil-bearing formation. Oil or water is normally injected into the formation at a moderate rate and an elevated pressure until a cracking of the formation occurs. The rupture of the formation is indicated by a pronounced pressure drop at the injection pumps. Injection is continued at an increased rate until a desired amount of cracking is accomplished. Accasionally fracturing alone substantially improves the productivity of petroleum-bearing formation; however, it is generally necessary to inject propping agents with the fracturing liquid in order to hold open the formation cracks after the liquid injection stops and to thus retain the improved fluid flow in the formation for an appreciable time.

The material most commonly utilized as a propping agent heretofore has been sand. In present-day operations the general practice is to screen-size the sand for the particular fracturing operation in which it is to be used. The sands used as propping agents in fracturing have been of small diameter, generally ranging between 60 mesh and 8 mesh. A predetermined quantity of propping agents is added to the fracturing liquid and injected with the liquid into the formation during the fracturing operation. The propping agents are generally added to the liquid after cracking of the formation occurs. After the pressure on the formation is removed, the propping agents hold open the formation and retain the fluid flow channels there created.

There are, however, disadvantages associated with the use of particulate material, such as sand, as the only propping agents. One disadvantage is a tendency for the sand to bridge up in a channel of the cracked formation. This may occur when one or more sand grains hang up in the channel and the sand grains following these initial grains become bridged against the formation and the leading grains. As the injection of the fracturing liquid continues, additional sand will build up behind the bridge. After the operation is completed and the pressure taken off the formation the sand will be compacted by the pressure exerted by the formation in trying to "heal" the newly created cracks. Since the sand is closely packed due to the pressure, permeability may be greatly reduced. In severe cases the ability of the formation to produce will be seriously hindered by the compacted sand particles.

One method directed at eliminating this disadvantage is the injection of fracturing propping agents made of porous inorganic material containing hydrocarbon material in the pore space to support a fractured formation. The hydrocarbon material is slowly soluble in the reservoir hydrocarbon liquids and after a time, this soluble material is dissolved out of the pore space of the inorganic propping agents thus increasing the permeability of the fracturing propping agents. The propping agents themselves are then more permeable. It has been found, however, that the increase in fluid flow through a random grouping of similar sized particulate material is only minutely increased if the particulate material is itself permeable rather than solid. In other words, given the same bridging of propping agents in a cracked formation, the amount of fluid flow is not appreciably increased by making the propping agents themselves permeable. A further disadvantage of this method is that the porous particulate material is inherently weaker than similar sized solid particles. The porous propping agent is further weakened as the soluble material dissolves from its pores because of the loss of rigidity afforded by this material. The strength of the particle may deteriorate to the extent that it will no longer support the walls of the formation which has been fractured. If this occurs, the particle will be crushed and the formation will heal itself.

It is an object of the present invention to provide a method of improving fluid flow in a formation by fracturing the formation and injecting therein a mixture of permanent propping agents and temporary spacing agents.

Further advantages and objects of the present invention will be obvious to those skilled in the art from the following detailed description.

Briefly, the present invention provides for injecting a combination of temporary spacing agents and permanent propping agents to support cracked strata obtained by fracturing a formation. The spacing agents are preferably particulate material of substantially the same size as the presized propping agents. The material selected for the spacing agent is desirably soluble or fusible in the reservoir fluids of the fractured formation at the temperature prevailing in the formation. The spacing agents and the propping agents are mixed in a predetermined ratio and are added to the fracturing liquid as it is injected into the formation. After the operation is completed, the spacing agents are eventually removed by the action of the reservoir fluids, leaving the propping agents to support the formation. Thus, even should bridging of particles occur, improved fluid flow channels are created and maintained in the formation.

In the practice of the present invention it is first necessary to select propping agents. Local conditions particular to the formation to be fractured are controlling in the selection of propping agents. Among the factors that determined selection of the propping agents are the pressure on the formation, the size of crack expected to be created during the operation, the type of rock in the formation, and the healing pressure exerted by the formation. Various economic considerations are also important in selecting a propping agent for a particular fracturing operation. Prevailing practice in the art taking into account the conditions of a particular fracturing operation can select a suitably sized and stressed propping agent.

Sand grains are one material suitable for use as a propping agent in a wide variety of environments. The grains in general range in size from 8 to 20 mesh for fracturing operations. Sand grains from 8 to 40 mesh, however, are satisfactory and are commonly used as propping agents. Sand for a particular operation is sized taking into account the extent of fracturing expected and the pressure expected to be exerted to heal the fracture after the completion of the fracturing operation.

The choice of propping agents, however, is not to be limited to sand alone. It is in keeping with the spirit of the invention to utilize particulate matter such as cracked nut shells or manufactured materials such as steel shot, plastic balls, or aluminum particles as the propping agents.

It is generally preferred to use this latter class of materials rather than sand or nut shells in formations where large cracks are expected or where high pressure will be exerted on the propping agents by the formation as it attempts to "heal" itself. More specifically, the manufactured propping agents are technically superior to sand as the propping agent when the desired size of the propping agent exceeds about .1 of an inch in diameter and/or when the pressure exerted on the particles by the formation is expected to be in excess of the compressive strength of the desired size sand or nut shell particles. The invention therefore is not to be limited by the material or size of propping agent selected for a particular fracturing operation. Rather, the method of the invention will improve fluid flow in a formation when practiced with any of the propping agents that are utilized in the art.

The invention provides for injecting spacing agents with the propping agents in a predetermined ratio. The spacing agents are desirably particulate matter of approximately the same general size as the propping agents. The spacing agents are composed of a material which will retain its competency during injection into the formation in an oil suspension or a water suspension. Since the spacing agents are not load bearing in the sense of supporting the formation, the compressive strength of the spacing agents is important only insofar as is necessary to keep the propping agents separated during injection into the formation. The spacing agents are then substantially removed by the reservoir fluids. Since the spacing agents and propping agents are mixed as they are placed in the formation, improved flow channels will be created between the propping agents as the spacing agents are removed by the reservoir fluids passing the spacing agents.

The spacing agents are initially sized according to the size of the preselected propping agents. The size of the spacing agents should be substantially the same size as the propping agents. It should be made clear that size may refer to a size range of particles selected for a particular fracturing operation. In other words, should the desirable size range of propping agents be between 20 mesh and 40 mesh, then the spacing agents should also be selected in this size range.

The liquid injection portion of most fracturing operations requires less than about eight to ten hours from start to finish. Many small operations require only from one to two hours. It is essential that the spacing agents be selected from material which will remain competent during at least the period required for the liquid injection. This is obviously necessary if the spacing agents are to be distributed randomly intermixed with the propping agents. After the propping agents and spacing agents are in place in the fracture and the pressure on the formation relieved to normal, the spacing agents are acted on by the formation fluids to melt or dissolve, or both, in order to insure creation of superior fluid flow channels. It is preferred that the spacing agents be about at least 70% removed by the action of the formation fluids within a month after the fracturing operation has occurred.

It is obvious from the above that it is desirable to have certain information regarding the formation that is to be fractured. The type of fracturing liquid must be known. The temperature of the formation should be determined by any convenient means. The characteristics of the formation fluids must be determined. Further, the expected time required for the fracturing operation must be estimated. This information is necessary in order to select a material for the spacing agents for a particular fracturing operation which will remain competent in the fracturing liquid and which will be removed by the formation fluids.

The types of fracturing liquids are divided into two general classes: oil and water. The individual properties of the liquids in one of the classes may vary depending on their particular chemical compositions. Rates of solubility of material for potential spacing agents must be determined in the particular liquid selected for a fracturing operation if the invention is to be practiced in its most desirable form. In some cases a material for propping agents might be acceptable for use with water as the fracturing liquid and the same material not at all desirable when oil is used as the carrier.

In one embodiment of the invention the spacing agents are selected from materials which are soluble in the reservoir hydrocarbon fluids. In many cases these materials will be fusible at temperatures below the formation temperature and in these formations they will also be partially removed by melting. The material utilized for propping agents in this embodiment of the invention is desirably at least 70% removed by the action of the reservoir fluids within about thirty days from the time the material is injected. An example of a material which provides suitable spacing agents of the type is naphthalene. Naphthalene is especially desirable when water is the fracturing liquid. Naphthalene may also be utilized when the fracturing liquid is oil, however, care must be taken to insure the naphthalene particles remain competent during the injection period. By competent it is meant that the particles substantially retain their space-taking capacity during the time necessary to complete injection into the formation. Naphthalene is commonly the chief constituent of moth balls and when properly sized with relation to a given preselected propping agent, or crushed to appropriate size, these moth balls are desirable as spacing agents. If a higher or lower melting point or solubility rate is desired, other aromatic hydrocarbon solids, for example, anthracene may be substituted for napthalene.

In some petroleum formations, suitable spacing agents may be selected from the natural asphaltite group of bituminous materials. These are naturally occurring hydrocarbons and have the desired degree of solubility in some reservoir fluids. A particular material of this group that is sometimes desirable as a spacing agent is gilsonite. Gilsonite may be ground to any desired size range from one inch in maximum dimension to as small as 80 mesh. The particles of gilsonite will retain their competency in oil at surface temperatures during the time necessary for injection into a formation. Gilsonite may also be carried into the formation in a water suspension.

A further example of a desirable material suitable for use as spacing agents is petroleum wax and particularly microcrylstalline wax. Different feedstocks and different manufacturing processes will produce microcrystalline waxes with different solubility rates and with melting points in the range of about 130° F. to 210° F. It is preferred to use higher melting waxes as spacing agents in most formations. Microcrystalline wax is especially desirable as spacing agents when water is used for the fracturing liquid. However, the wax particles may be used in an oil-fracturing liquid if they retain their competency for at least the period required for injection into the formation in a particular fracturing operation. The microscrystalline wax may be molded into the desired size range or alternatively, the wax may be broken into pieces and screen-sized to the desired range.

In an alternative form of the invention where it is desired to make use of the fusibility of the material utilized as spacing agents to take the agents out of the formation, the fusible temperature should be at most equal to the formation temperature. The fusible temperature of the material is preferably from 1° F. to 10° F. less than the formation temperature. However, the fusible temperature of the material may be substantially less than the formation temperature consistent with the requirement that the spacing agents retain their competency during their transportation into the formation in the fracturing liquids. In this regard the fusible temperature of the spacing agents may be as low as 30° to 50° F. above the temperature of the fracturing liquid at the earth's surface prior to injection in the well even though the temperature of the formation is substantially higher. This is because it takes a longer time for the formation to heat the large volume of rapidly injected liquid any appreciable amount than it takes for the spacing agents and propping agents to be placed in the formation.

It is sometimes preferred to utilize a substance that is relatively insoluble in petroleum for a spacing agent when an oil is used as the fracturing fluid. This is particularly the case when the common oil-soluble spacing agents will not retain their competency in oil during the time necessary for injection into the formation. These relatively insoluble agents depend solely on melting to be carried out of the formation. An example of this type of material is rhombic sulphur. The sulphur should also be sized with relation to the size of the propping agents as herein described.

In formations that produce large amounts of water with the desirable petroleum products it is advantageous to use water-soluble, relatively oil-insoluble spacing agents. Formations that are or have been exposed to water flooding often tend to produce large amounts of water and this water may dissolve out the water-soluble spacing agents to insure the retention of improved fluid flow paths created by the fracturing operation. An example of this type of spacing agents is rock salt.

The most generally used field method for injecting propping agents into an oil-bearing formation consists simply in running the propping agents through a pump used to pressurize a formation in the fracturing operation. Generally in fracturing operations there is a supply of fracturing liquid in a tank elevated above the injection pump with gravity feed to the pump so that liquid moves to the pump by gravity and by suction provided by the pump. There is a hopper provided between the pump and the liquid tank where propping agents are added to the liquid on the suction side of the pump. The method of the invention may be practiced by mixing the spacing agents and propping agents before adding them to the hopper. The mixture moves through the pump and down well and into the cracked formation. The propping agents and the spacing agents are preferably mixed prior to being added to the fracturing liquid.

It is preferred to add the propping agents and spacing agents to the liquid in about a 1:1 ratio. In some areas it may be desirable to adjust the ratio of propping agents to spacing agents. Ratios of from three propping agents to one spacing agent, and ten spacing agents to one propping agent are adequate in most fracturing operations.

The invention having been fully described, I claim:

1. A method of increasing fluid flow from a formation having at least one fracture created therein and penetrated by a well comprising determining the temperature of said formation, selecting a material fusible at less than said temperature, particulating said material, segregating a predetermined size range of said material, combining said material in a predetermined ratio with preselected propping agents to form a mixture of said material and said propping agents, suspending said mixture in a liquid, forcing said liquid containing said mixture into said fracture while maintaining the competency of said fusible material and removing the said fusible material from said fracture without the application of an extraneous source of heat thereto.

2. The method of claim 1 where the melting point of said material is at least 30 degrees F. above the surface temperature of said liquid.

3. The method of claim 1 where the melting point of said material is from 1° to 10° F. less than said determined formation temperature.

4. A process for treating a subterranean formation penetrated by a well comprising determining the temperature in the formation adjacent the well, injecting a fracturing fluid down said well and into said formation under sufficient pressure to fracture said formation, displacing into said fracture at least a portion of said fracturing fluid including a mixture of solid propping agents and solid spacing agents of substantially the same size as the said propping agents suspended therein, said spacing agents being composed of discrete particles of fusible material having a melting point less than said determined temperature, depositing said mixture in the fracture while maintaining the competency of said spacing agents, releasing the pressure on said formation, and substantially removing the said spacing agents from the formation without the addition of extraneous heat to said formation.

5. The process of claim 4 where the fusible material has a melting temperature between 1° F. and 10° F. less than the temperature of the formation which is fractured.

6. The process of claim 4 where the fusible material is wax.

References Cited by the Examiner

UNITED STATES PATENTS

| | | |
|---|---|---|
| 2,645,291 | 7/1953 | Voorhees. |
| 2,788,072 | 4/1957 | Goodwin _____ 166—42.1 |
| 2,879,847 | 3/1959 | Irwin _____ 166—42.1 |
| 3,072,192 | 1/1963 | Van Poolen _____ 166—42.1 |

CHARLES E. O'CONNELL, *Primary Examiner.*

D. C. BLOCK, T. A. ZALENSKI, *Assistant Examiners.*